United States Patent [19]
Stotlar

[11] 3,932,753
[45] Jan. 13, 1976

[54] PYROELECTRIC DEVICE WITH COPLANAR ELECTRODES

[75] Inventor: Suzanne C. Stotlar, Garretsville, Ohio

[73] Assignee: The Harshaw Chemical Company, Cleveland, Ohio

[22] Filed: Dec. 30, 1974

[21] Appl. No.: 537,241

Related U.S. Application Data

[63] Continuation-in-part of Ser. No. 406,812, Oct. 16, 1973, abandoned.

[52] U.S. Cl. ............... 250/332; 250/338; 250/370; 338/18
[51] Int. Cl.² ....................................... G01J 1/00
[58] Field of Search .......... 250/338, 349, 332, 338, 250/370; 73/362 CP; 338/18; 310/4, 5, 9.5

[56] References Cited
UNITED STATES PATENTS

| | | | |
|---|---|---|---|
| 3,480,777 | 11/1969 | Astheimer | 250/332 |
| 3,772,518 | 11/1973 | Murayama | 250/332 |
| 3,816,750 | 6/1974 | Liu | 250/338 |
| 3,842,276 | 10/1974 | Southgate | 250/370 |

*Primary Examiner*—Harold A. Dixon
*Attorney, Agent, or Firm*—James A. Lucas, Esq.; Alfred D. Lobo, Esq.

[57] ABSTRACT

A device which includes proximately disposed electrodes in side-by-side relationship on a surface of a pyroelectric material which electrodes serve to transmit a signal. The electroded surface preferably contains the c-axis, or is parallel to it, and the performance of the detector is determined, apart from material parameters, by the parallel length of oppositely disposed electrodes and the separation therebetween. Pyroelectric detectors fabricated with essentially single surface coplanar electrodes are more economical and achieve better responsivity than electrodes disposed in opposed planes normal to the c-axis, as in conventional devices. Poling requirements of materials useful in pyroelectric detectors of this invention are similar to the requirements of materials used with conventional c-face (i.e., c-axis normal) electroded devices.

6 Claims, 6 Drawing Figures

PYROELECTRIC DEVICE WITH COPLANAR ELECTRODES

CROSS-REFERENCE TO RELATED APPLICATION:

This application is a continuation-in-part application of Ser. No. 406,812 filed Oct. 16, 1973 now abandoned.

BACKGROUND OF THE INVENTION

Certain crystals have the property of becoming charged at opposite ends when their temperatures change. This phenomenon is known as pyroelectricity and results from the anharmonic ionic vibrations possible in those crystal classes lacking a center of symmetry. Crystals displaying this effect are said to be pyroelectric and display pyroelectricity only along a polar axis, called the c-axis, a crystallographic direction in which the axial direction and its opposite are non-equivalent in a crystallographic sense. For those skilled in the art, the optical axis along which there is zero birefringence is termed the c-axis (see *Crystals and Light*, Elizabeth A. Wood, D. Van Nostrand Co., Inc., Princeton, N. Jersey 1964). Non-cubic crystal systems require four indices to specify a plane. The c-axis in Miller-Bravais indices is (0001). Pyroelectric materials are generally uniaxial crystals. In biaxial crystals the c and z axes are parallel. This zero birefringence axis (c-axis) may be determined by standard optical x-ray techniques such as with a goniometer. The phenomenon of pyroelectricity in a substantially single domain body of material is well described in the literature.

To be useful, any pyroelectric material must be poled such that the majority of the electric dipoles are aligned in one direction. The only direction in a pyroelectric material along which this can occur is the same direction as the optical c-axis. The material is poled by determining the direction of the optical c-axis and cutting the ingot to have opposite faces normal to the c-axis. Electrodes are then applied to each opposite face. When a bias or voltage is applied between two of these planes or faces to pole the material, current is directed along this c-axis and the dipoles are induced to align themselves in the same direction. Elevating the temperature of the material facilitates alignment of the dipoles. Because the materials are ferroelectric there is a transition temperature or temperature region where the pyroelectric dipoles are freed and may be aligned more easily than at 25° C. This transition temperature is called the Curie temperature and pyroelectric materials are generally poled near or above the Curie temperature. Polyvinyl fluoride films do not exhibit a Curie temperature but increased temperature does aid in poling them. In any usable device, it is necessary for a pyroelectric material to be poled to exhibit pyroelectric properties.

In a conventional pyroelectric device, poled as described hereinabove, a poled crystal with electrodes on opposed faces normal to the c-axis is connected into an appropriate electronic circuit where it will behave as a variable capacitor in parallel with an impedance. In operation, one can consider a rapid change of temperature of the crystal which induces a change in voltage drop across the crystal as a shift in the direction of the c-axis. However, in the specification we use the term c-axis in a manner conventionally used by those skilled in the art, which is, to refer to the optical axis of zero birefringence for an unpoled material. The shift which occurs as a result of chopped radiation impinging upon the crystal is transient. When the intensity of the radiation is no longer changing the c-axis will return to its original direction. In other words, a user would refer to the c-axis as being that direction the c-axis would take when the crystal is experiencing no change in radiation intensity.

The voltage generated in a pyroelectric material undergoing a rapid change in temperature is proportional to the change of temperature. Thus a rapid rise or fall in temperature would generate a large voltage, but a constant temperature, even if high, will generate no voltage. Voltage changes may be measured by attaching electrodes to a pyroelectric crystal thus forming a detector that can detect any type of radiation which increases the crystal temperature in a short time span. Unlike other types of thermal detectors such as the bolometer, the output of pyroelectric detectors does not depend on them attaining thermal equilibrium with incident radiation, and therefore they can operate at higher frequencies. Also, they need not be cooled to obtain efficient operation.

Our device may be grounded in a conventional manner and in a circuit it has similar overall characteristics as a conventionally electroded device. It should be clear that the net result of utilization of the coplanar electrodes of this invention makes one surface of a crystal independent of any other surface. Thus one may have plural coplanar electrodes on a single surface or plural coplanar electrodes on plural surfaces, the electrodes on one surface being independent of those electrodes on another surface.

A good pyroelectric material should have high responsivity and low minimum detectable power. However good the responsivity, and the material parameters, the accuracy with which one can measure the change in the temperature of the crystal depends largely on the electrodes used and the associated circuitry.

To date, all pyroelectric crystals are generally provided with two faces both of which are normal or perpendicular to the c-axis of the crystal and thus disposed in parallel planes in spaced apart relationship with each other. Each face is provided with an electrode. Thus the electrodes are oppositely disposed on opposite faces of the crystal in parallel planes perpendicular to the c-axis. The electrodes are referred to as c-face electrodes. When the electrodes are disposed on opposed edge surfaces of a chip they are more particularly referred to as edge type electrodes, and when they are disposed on opposed faces, as described, they are referred to as face-type electrodes. It will be recognized that both types are c-face electrodes.

In contrast with prior art devices, the pyroelectric detector element of this invention has both electrodes on the same surface or side of the pyroelectric material, and are called coplanar electrodes. As will be explained hereinafter, the coplanar electrodes are preferably disposed in a plane which contains the c-axis. Such a plane containing the c-axis is defined by a plane normal to the conventional c-face electroded planes of a pyroelectric device.

A pyroelectric device having a pair of electrodes adjacent to one another on the top surface of a crystal is shown in U.S. Pat. No. 3,480,777 to Astheimer. The crystal is poled in a direction normal to the plane in which the electrodes lie and the pyroelectric response conveyed therebetween is not independent of electrodes on other surfaces. The pairs of electrodes are deployed to split up the material into plural conventionally c-face electroded devices, to reduce total capacitance. No pair of coplanar electrodes as used therein contains, or is parallel to, the c-axis of the material.

Electrodes in my device may be made of any conductive material, for example, gold, platinum, molybdenum, silver, tantalum, silicon, etc. Gold and silver are convenient to use and can be prepared by any one of numerous methods which result in a thin, e.g., less than about 0.2 μ (micron) layer, but may be thicker if desired. If the radiation is to pass through the electrode, the electrode must be thin enough to be transparent to the radiation. Whenever the radiation wavelength lies within the transparency region of the crystal, an absorbing coating must be used on at least one face of the crystal through which the radiation is to enter. Those skilled in the art will recognize that a pyroelectric device is not generally designed to perform under conditions where the radiation causes a temperature increase which melts or destroys the crystal. The usual temperature increase during operation is less than 1° C. and destruction of the crystal is seldom a problem.

Typically electrodes, whether edge-type electrodes or face-type electrodes, cover a relatively large portion of the surface of the material in order to collect maximum current. Because edge-type electrodes have a higher resistance and a lower capacitance than do face-type electrodes, they give a faster response and are therefore preferred for those applications such as signal receiving where fast response time is desirable. Face-type electrodes may give better results for applications such as thermicon imaging devices. The output of a pyroelectric detector is amplified if necessary, by a suitable amplifier and is displayed, for example, with an oscilloscope.

It is known that particularly where one wishes to scan, or when the beam is small, a pyroelectric detector must necessarily be a small-area device. Particularly in the closely-spaced elements of an array, it is necessary that these small-area devices be, in addition, as uniform as possible. Thus, most arrays presently comprise a multiplicity of detectors each on a separate element. It is recognized that ideally, better performance could be achieved if all electrodes were deposited on a single element. To date, this is possible only at the expense of high levels of cross-talk and other difficulties related to non-uniformity of the thickness of the element.

In conventional devices, cross-talk is generated by proximity of electrodes and arises particularly with plural electrodes when the distance between electrodes on one surface is not sufficiently large in relation to the distance between oppositely disposed electrodes. As a rule of thumb, the distance between electrodes on one surface must be at least ten times greater than the thickness of material which separates oppositely disposed electrodes. Thus, when an array is desired as for a vidicon, a thermal spectrophotometer, a thermograph, or the like, the relatively large separation required even for a thin material (say 100 μ thick) poses a difficult problem of size. To decrease separation and thus size, it becomes necessary to resort to even thinner materials. It will be evident that to obtain material less than 100 μ thick is not an easy task, and to grind or polish such thin materials uniformly is even more difficult. Predictably, the cost of conventional arrays made with plural separate detector elements, limits their application to devices where cost is not a factor, irrespective as to whether the array is a face-type or edge-type array. Arrays made in accordance with this invention are particularly suited to the fabrication of large area arrays of arbitrary size, having the advantages of edge-type arrays but which, surprisingly, do not have the difficulty of control normally associated with edge-type arrays.

The pyroelectric devices of this invention make an unexpectedly advantageous use of the factors which determine voltage responsivity $R_r$ in the simplified formula applicable to them:

$$R_r = \frac{\eta \lambda}{\omega \epsilon_0 k' \rho C_p A}$$

where
$\eta$ = emissivity
$\lambda$ = pyroelectric coefficient
$\omega$ = measuring frequency
$k'$ = dielectric constant
$\rho$ = density
$C_p$ = specific heat
$A$ = electrode area
$\epsilon_0$ = permittivity of free space From the above equation it is clear that, since for any given material, the separation between electrodes has little impact, the dominant factor is electrode area. In a device having coplanar electrodes this electrode area is determined by the length of each edge of each oppositely disposed electrode and an "effective thickness", greater than the actual thickness of the electrode deposited, which thickness might be considered an "effective penetration depth" due, possibly, to a fringing effect. This fringing effect may explain why, though electrode separation is not important in theory, it is important in the device, because greater separation requires deeper fringing. This effective penetration depth extends beneath the electrode edge into the material. This effective penetration depth, in practice, appears to be a function both of electrode separation, and, possibly material parameters locked into the element, but is unrelated to the depth of penetration of absorbed radiation. With this coplanarly electroded device it is practical to achieve very small effective areas with greater ease, better control, and, with more attractive economics than with conventional c-face electroded devices.

It is not essential that oppositely disposed coplanar electrodes be disposed in one to one correspondence, but only that a portion of each electrode be oppositely disposed with respect to the other. Only these correspondingly oppositely disposed portions of the electrodes determines the responsivity of the device. The actual geometry of electrodes used may be chosen for considerations other than responsivity. If a section of pyroelectric material has plural interconnecting electrodes on opposing c-faces, electrodes placed on the same surface can be used to pole the material, but the direction of polarization will lie normal to the plane of the poling electrodes and the device will behave as two or more capacitors electrically in series but thermally in parallel. The direction of polarized material can generally be determined by optical methods. This invention does not include any device in which a pair of poling electrodes are disposed on opposed surfaces.

Briefly, a coplanar or single surface electroded pyroelectric detector is one in which essentially single poled domains have been aligned between electrodes on a single or individual surface of a pyroelectric material irrespective of other surfaces of the material.

Pyroelectric devices, according to this invention, combine the advantages of both conventional edge-type and face-type electrodes without some of the disadvantages of either, and the manner in which they are fabricated makes it possible for the first time to obtain high performance inexpensively. Moreover, these detector elements permit their more versatile use with standard amplifiers and circuitry. In normal applications, problems of humidity, microphonics, noise, dirt accumulation and other technical problems will be no worse than with conventional devices.

SUMMARY OF THE INVENTION

It is therefore, a general object of this invention to provide a pyroelectric detector in which the electrodes are proximately disposed in side-by-side relationship on the same surface of a pyroelectric material.

It is another general object of this invention to provide a pyroelectric detector with coplanar electrodes disposed in close side-by-side relationship in a plane containing the c-axis in such a manner as to behave as a very thin edge-type pyroelectric detector.

It has been discovered that coplanar electrodes disposed in side-by-side relationship on the surface of a pyroelectric material perform in a manner analogous to conventional edge-type pyroelectric detectors without some of their disadvantages.

It is still another object of the instant invention to provide small area devices with high signal-to-noise ratio and with high voltage responsivity, which devices may be adapted for use in the fabrication of arrays.

It is yet another specific object of this invention to provide pyroelectric devices having small area which may be fabricated for a fraction of the cost of conventional detector assemblies with c-face electrodes.

It is still another object of this invention to provide a pyroelectric device which may be utilized for the fabrication of arrays by depositing a multiplicity of closely-spaced coplanar electrodes on a non-c-face of a pyroelectric material by masking the electrodes to obtain precision of spacing.

It is a particular object of this invention to utilize a relatively thick crystalline material to form a device in which a first pair of coplanar electrodes are operatively disposed on one non-c-face of the material and a second pair of coplanar electrodes are operatively connected on an oppositely disposed generally parallel non-c-face of the material, the first pair being in non-interfering relationship with the second, so that signals from the first pair may be compared with signals from the second pair.

These and other objects, features and advantages of the coplanar electrode pyroelectric device of this invention and the method of making it, will become apparent to those skilled in the art from the following description of preferred forms thereof and the illustrative examples set forth herein.

DETAILED DESCRIPTION OF PREFERRED EMBODIMENTS OF THE INVENTION

The pyroelectric detectors of this invention are particularly directed to small area devices which are difficult and expensive to fabricate in conventional detector assemblies with c-face electrodes oppositely disposed in c-axis normal faces of a pyroelectric material.

In a preferred embodiment of this invention, coplanar electrodes of this invention are preferably disposed in a plane containing the c-axis, or in a plane parallel to the c-axis. This preference is predicated upon the c-axis sensitivity of any pyroelectric material. It is not critical that the coplanar electrodes of this invention be disposed in a plane containing the c-axis. They may be disposed in any non-c-face plane, and even a c-face plane. A usable pyroelectric detector is obtained provided the electrodes are disposed on a surface in a manner so that there is some material in a straight line in the c-axis direction between the spaced-apart electrodes. It is found that coplanar electrodes disposed on a face which does not contain the c-axis will generally exhibit lower responsivity but, possibly less noise.

As stated hereinbefore, conventional pyroelectric devices have c-face electrodes disposed in spaced-apart, essentially parallel planes which are normal to the c-axis of the material. Simply moving one c-face electrode next to the other will give a usable device, but the voltage responsivity is poor, possibly because there is very little material between the electrodes in a straight line in the c-axis direction.

Figure 1:
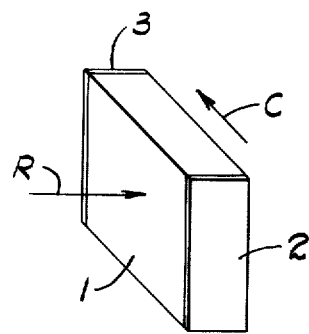
FIG. 1 is a perspective view of a conventional c-face electroded pyroelectric detector element illustrated with edge-type electrodes.

Referring now to FIG. 1, there is shown a crystal 1 of pyroelectric material such as strontium barium niobate, which has been cut, ground and polished into a rectangular shape. The arrow marked C indicates the c-axis (the polar axis) of the crystal, and the arrow marked R indicates the direction of the incident radiation. The other figures are similarly marked. Two edge faces of the crystal 1 are normal or perpendicular to the c-axis, and are coated with electrodes 2 and 3 respectively which sense a pyroelectric voltage generated within the crystal, thus forming a conventional edge-type pyroelectric detector element.

Figure 2:
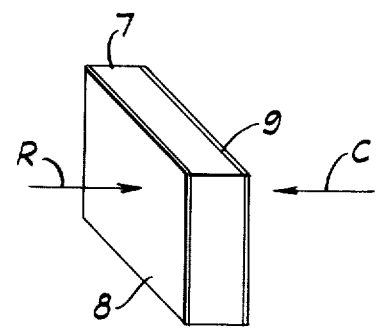
FIG. 2 is a perspective view of a conventional c-face electroded pyroelectric detector element illustrated with face-type electrodes.

Referring now to FIG. 2 there is shown another rectangular crystal 7 of a pyroelectric material with two faces perpendicular to the c-axis which are coated with electrodes 8 and 9 respectively to form a conventional face-type pyroelectric detector element. Each pair of electrodes in the detector elements of FIGS. 1 and 2 are c-axis normal or c-face electrodes and the detector is said to be c-face electroded.

Figure 3:
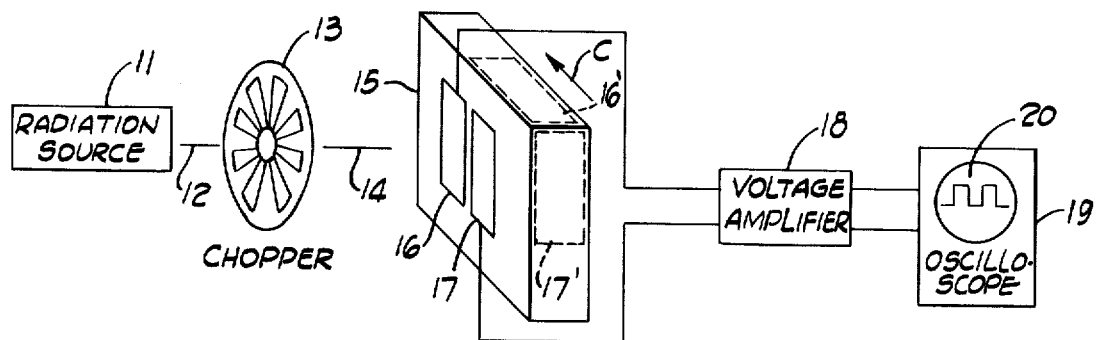
FIG. 3 is a diagrammatic perspective view of a pyroelectric device including a non-c-face electroded pyroelectric detector element illustrated with coplanar electrodes in a plane containing the c-axis, as used according to this invention, to detect radiation.

Referring now to FIG. 3, there is shown diagrammatically, a source of radiation 11 which may be any source of radiation capable of generating a pyroelectric response. Portions of a beam 12 pass through a rotatable chopper 13 which produces pulses of light 14 which impinge upon a crystal 15 of pyroelectric material. Any pyroelectric material may be used but inorganic crystalline materials, such as strontium barium niobate, sodium barium niobate, thallium arsenic selenide, lithium niobate and the like, and organic materials such as triglycine sulfate (TGS) are preferred. Each pulse raises the temperature of the crystal 15 a fraction of a degree for a fraction of a second. The temperature pulse generates a pyroelectric voltage which is sensed by electrodes 16 and 17 and sent to voltage amplifier 18 where it is amplified. The amplified voltage is sent to oscilloscope 19 and is displayed on screen 20 of the oscilloscope.

The performance of the coplanarly electroded detector of this invention is determined by the separation therebetween. The shorter the length and the closer the electrodes, the higher the voltage responsivity. Thus, these devices behave as very thin edge-type pyroelectric detectors. Surprisingly however, where one electrode is disposed in a c-face normal plane such as is shown in phantom outline at 17', and, another electrode in a non-c-face plane as shown in phantom outline at 16', a useful detector element is not obtained.

Figure 4:
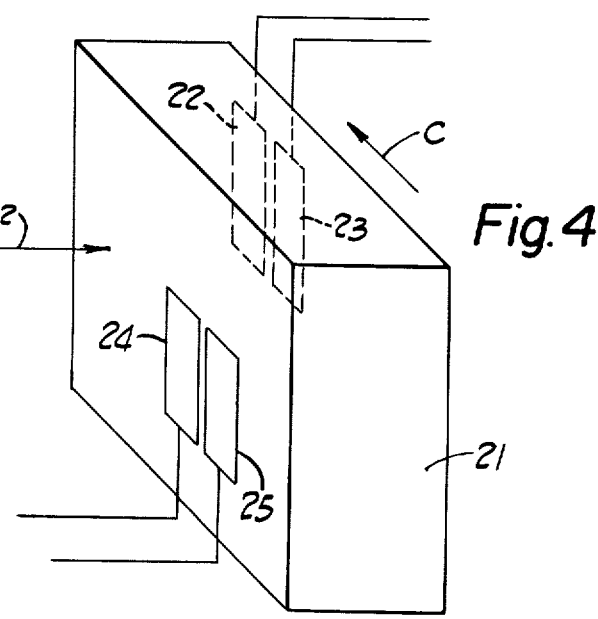
FIG. 4 is a perspective view of an illustrative form of pyroelectric detector element in which a pair of non-c-face electrodes is disposed coplanarly in a plane containing the c-axis, and another pair of non-c-face electrodes is oppositely disposed in a parallel spaced apart plane containing the c-axis.
Figure 5:
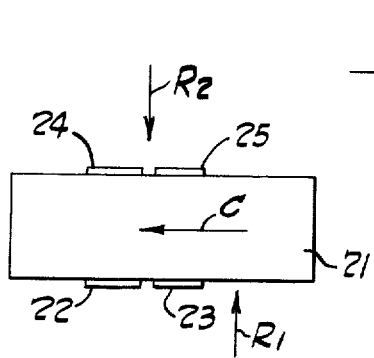
FIG. 5 is a plan view of the pyroelectric detector element of FIG. 4.

Referring now to FIGS. 4 and 5 there is shown a single pyroelectric crystalline section 21 of a pyroelectric material, in a right parallelepiped. The direction of its c-axis is indicated by the arrow marked c. One of two parallel faces has a pair of non-c-face electrodes 22 and 23 disposed coplanarly in a plane containing the c-axis and an opposite parallel face has another pair of non-c-face electrodes 24 and 25 disposed coplanarly in another plane containing the c-axis, as shown in FIG. 4. Each pair of electrodes is adapted to send a sensed pyroelectric voltage to an amplifier by means of suitable connections (not shown). The device so formed is a differential detector element capable of comparing signals generated by radiation $R_1$ on one side and radiation $R_2$ on the other. It will be understood that in such a device the crystalline section 21 must be of sufficient thickness so as to absorb the radiation on one face without permitting it to affect the electrodes on the opposite face. Though useful for the comparison of two sources, as described, it is not necessary that both pairs of electrodes be irradiated. For example one pair of electrodes may be used to monitor only background radiation as a reference, though such background radiation may not be always present. In other words, each pair of electrodes is in electrically non-interfering relationship with one another, or each pair is electrically essentially independent of the other. Other uses for a differential detector element of this invention will be apparent to those skilled in the art who will appreciate the advantage of having such a device on one crystalline section, rather than going to the greater expense of fabricating and matching two, or more, individual detector elements. In the most advantageous use of this invention the c-axis lies in the plane of the electrodes. If this were the case in a conventional device, a pyroelectrical voltage between 22 and 24, or 23 and 25, (see FIG. 5) could not be developed, even if a poling voltage had been applied, because the magnitude of the theoretical voltage would be multiplied by the cosine of the angle between the c-axis and the direction of the current flow between the electrodes. Since a line drawn between 22 and 24, or 23 and 25 would be 90° from the c-axis, the voltage developed would be zero.

Figure 6:
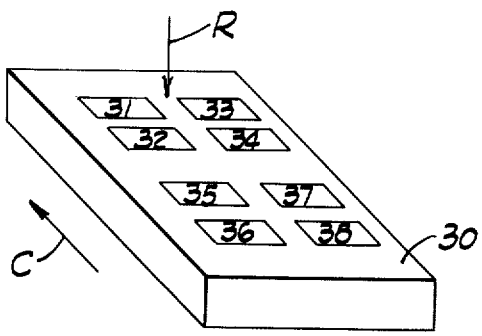
FIG. 6 is a perspective view of an illustrative form of an array of detector elements, useful, for example, for image reproduction and beam positioning.

The device of FIG. 6 is a simple array, useful, for example, in detecting and centering a pulsed or otherwise modulated infrared beam. An array such as this may be used in a thermograph or vidicon, or simply to position a coherent laser. The array shown is made up of a single pyroelectric crystalline section 20 in which the polar or c-axis is in the direction of the arrow identified by the letter C. The direction of impinging radiation is marked by the letter R. Four pairs of electrodes 31-32, 33-34, 35-36 and 37-38 are deposited on the surface of the crystal 20 and are essentially coplanar in a plane parallel to the c-axis. Edge-electrical connections are made with individual electrodes 32, 34 36 and 38 which are grounded, and with individual electrodes 31, 33, 35 and 37 which are connected to an amplifier. An array of this structure may be fabricated in an arbitrary size on a single crystalline section, limited only by the size of section available. Plural arrays, each on a single crystalline section, may be combined to provide even larger arrays. It is found that these arrays exhibit surprisingly little fringing and cross-talk, have low capacitance and enhanced rise time. Most importantly, an array may be tailored to give desired characteristics by modifying the electrode geometry.

The following examples serve to illustrate this invention and demonstrate the considerations outlined hereinabove.

EXAMPLE 1

A. A device is assembled, according to the teachings of this invention, using a chip 2 mm. × 2 mm. × 0.25 mm. having a mixed crystal composition of 75 strontium niobate/25 barium niobate, such as is disclosed in U.S. Pat. No. 3,571,592, on which is electrodeposited 2 gold electrodes in side-by-side relationship on one face of the chip as shown in FIG. 3, that is, in a non-c-face plane which contains the c-axis. The electrodes are typically rectangular, having dimensions of 0.34 mm. × 0.34 mm. and a separation of about 0.34 mm. The active area between the electrodes is thus 0.12 mm². The electrodes are connected to an oscilloscope and the detector element is exposed to a beam of chopped infrared radiation directed between the electrodes. The voltage responsivity ($R_v$) is noted.

B. A chip of the same material used in Example 1A hereinabove, and having the same dimensions, i.e., 2 mm. × 2 mm. × 0.25 mm. is edge-electroded in a conventional manner, with gold electrodes on oppositely disposed c-axis-normal faces of the chip. The electrodes are 1 mm. × 0.25 mm. The detector element is tested with the same source of radiation as that used hereinabove and the voltage responsivity ($R_v$) noted.

A comparison of the $R_v$ obtained in Examples 1A and 1B hereinabove indicates that the conventionally edge-electroded device of Example 1B displays less than one-tenth the $R_v$ of the coplanar electrodes, because of the greater effective area.

EXAMPLE 2

In an analogous manner, additional detector elements are fabricated and tested utilizing different stoichiometric proportions of strontium barium niobate for each pyroelectric chip. The voltage responsivity obtained for each detector element indicates that the expected relationships between material composition and the $R_v$ obtained, for example, the theoretical $R_v$ of 50/50 SBN is 4 times greater than that of 75/25 SBN for detectors of the same physical area and configuration.

EXAMPLE 3

A. In a manner analogous to that described in Example 1 hereinabove, gold electrodes 1 mm. × 0.5 mm. are electrodeposited in a non-c-face plane with a separation of 1 mm. on a chip of lithium niobate. Another chip of lithium niobate of the same dimensions has also electrodeposited thereupon, in a non-c-face plane, a pair of electrodes of the same size, i.e., 1 mm. × 0.5 mm. having a separation of 1 mm. The $R_v$ obtained for each device is the same.

B. A conventionally edge-electroded lithium niobate chip, that is, c-axis-normal face electroded, is used as a detector element and the $R_v$ obtained. It is found that the voltage responsivity of the conventionally edge-electroded detector element is less than one-tenth that obtained in the non-c-face electroded detector elements tested in Example 3A hereinabove.

EXAMPLE 4

A. A chip 2 mm. × 2 mm. × 0.25 mm. of 50/50 SBN is conventionally c-face electroded with face type electrodes such as those shown in FIG. 2 of the accompanying drawings. The detector element is tested and the $R_v$ noted.

B. A chip 2 mm. × 2 mm. × 0.25 mm. of 50/50 SBN is electroded with a pair of gold electrodes deposited in side-by-side relationship on a c-axis-normal plane. The electrodes are deposited about 0.25 mm. apart. The chip is exposed to a beam of infrared radiation directed between the electrodes and the $R_v$ of the detector element obtained.

A comparison of the $R_v$ obtained in Examples 4A and 4B hereinabove indicates that the $R_v$ of coplanar electrodes is better than those of conventionally c-axis normal oppositely exposed electrodes.

EXAMPLE 5

Various arrays having different numbers of coplanar electrodes on a single piece of crystalline pyroelectric material have been fabricated, and they behave as expected in light of the discovery of the advantages of coplanar electrodes.

It will be appreciated that practical applications of the instant invention will generally be influenced by the physical considerations of the manner in which the detector elements are to be used, the particular material parameters locked into the pyroelectric material, and the limitations of equipment and technical skill of those wishing to produce the elements.

Modifications, changes and improvements to the preferred forms of the invention herein disclosed, described and exemplified may occur to those skilled in the art who come to understand the principles and precepts thereof. Accordingly the scope of the patent to be issued herein should not be limited to a slavish imitation of the particular embodiments of the invention set forth herein, but rather should be limited by the advance of which the invention has presented the art.

I claim:

1. A single surface pyroelectric detector comprising in combination a substantially single domain body of ferroelectric material provided with a pair of electrodes to convey therebetween a pyroelectric response of said material, said electrodes being proximately disposed in a spaced-apart relationship on a generally planar single surface of said material which has been poled by a polarizing voltage between said electrodes, said response conveyed between said pair of electrodes being essentially independent of other responses conveyed between other electrodes on said material.

2. The pyroelectric detector of claim 1 wherein said surface is orthogonal to the c-axis of said material.

3. An array or mosaic comprising in combination single crystalline body of pyroelectric material, plural pairs of electrodes approximately disposed in spaced-apart relationship on a generally planar surface of said material wherein each pair of electrodes directly conveys therebetween pyroelectric response of said material and said response of one pair of electrodes in independent of another pyroelectric response of another pair of electrodes on another opposed surface.

4. A pyroelectric detector comprising a single body of relatively thick crystalline material capable of generating a pyroelectrical response, a first pair of coplanar electrodes operatively disposed on one face inclined to the c-axis of the material at an angle other than 90°, a second pair of electrodes operatively connected on an oppositely disposed face of said material, said first pair being electrically essentially independent of said second pair, so that signals from said first pair may be compared with signals from said second pair.

5. A single surface pyroelectric detector comprising in combination a substantially single domain body of ferroelectric material provided with a pair of electrodes to convey therebetween a pyroelectric response of said material, said electrodes being proximately disposed in a spaced-apart relationship on a generally planar single surface parallel to a plane containing the c-axis of said material which has been poled by a polarizing voltage between said electrodes, said response conveyed between said pair of electrodes being essentially independent of other responses conveyed between other electrodes on said material.

6. An array or mosaic comprising in combination a single crystalline body of pyroelectric material with plural pairs of electrodes proximately disposed in spaced-apart relationship on a generally planar surface parallel to a plane containing the c-axis of said material wherein each pair of electrodes directly conveys therebetween a pyroelectric response of said material and said response of one pair of electrodes is independent of another pyroelectric response of another pair of electrodes on another opposed surface.

* * * * *